3,536,834
TELEPHONE LINE LOADING COIL CASE
Howard A. Dvorak, Brookfield, Ill., John C. Fleckenstein, Joppa, Md., and Robert J. Reinebach, Westchester, Ill.; said Dvorak and said Reinebach assignors to Western Electric Company, Incorporated, New York, N.Y., said Fleckenstein assignor to Bell Telephone Laboratories, Incorporated, Murray Hill and Berkeley Heights, N.J., both corporations of New York
Filed Nov. 29, 1968, Ser. No. 779,769
Int. Cl. H01f 17/08
U.S. Cl. 178—46        5 Claims

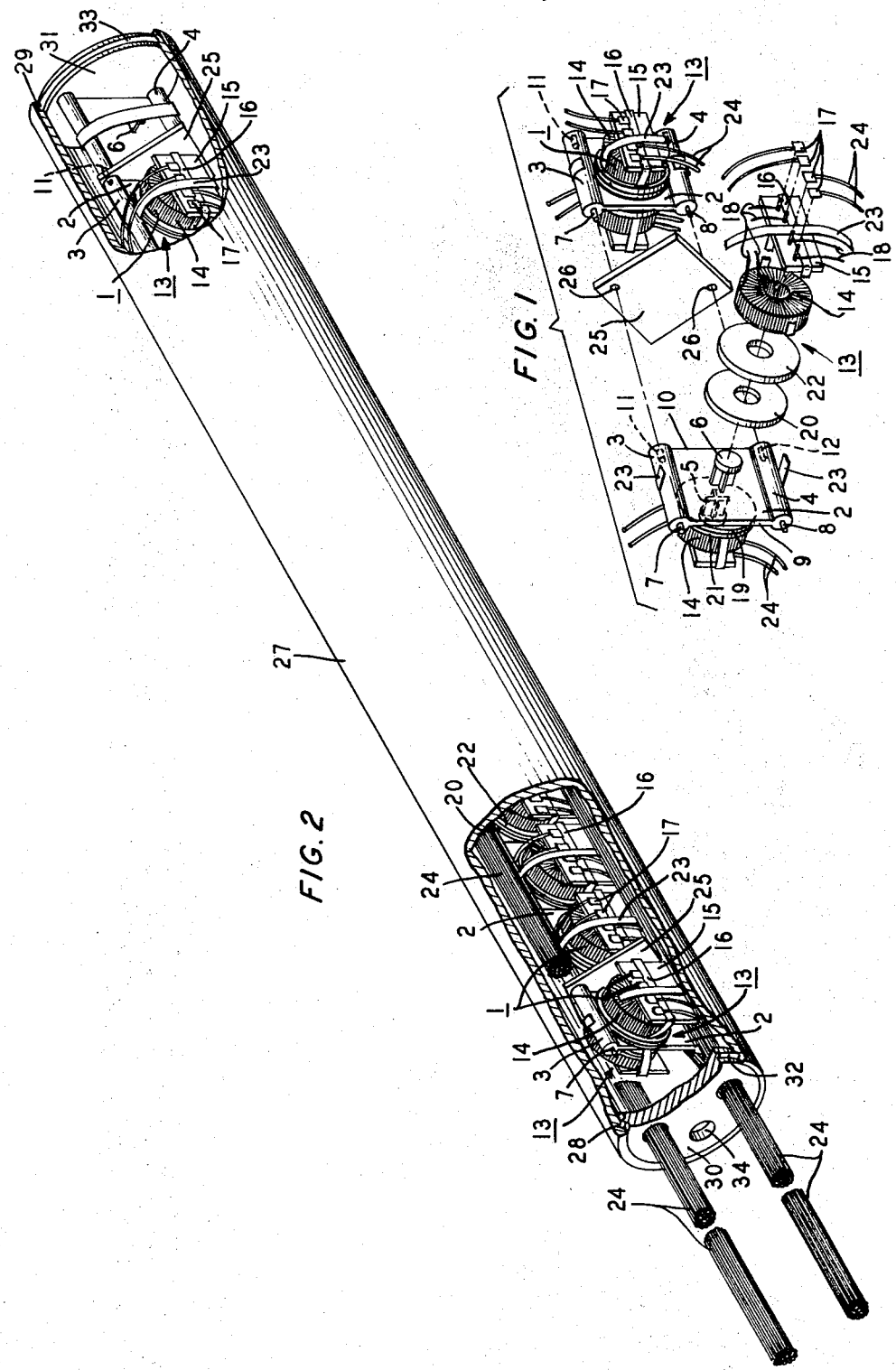

ABSTRACT OF THE DISCLOSURE

Telephone loading coils are mounted in pairs on a module comprising a two-sided coil holder with mounting dowels and side beads constructed with aligning pins. Any number of such modules can be stacked by plugging one into the next. The stacked modules are housed in protective tubes where they are held in axial alignment by two or three spacers, until plugging compound is injected.

TELEPHONE LINE LOADING COIL CASE

This invention relates to cases or enclosures for telephone loading coils, and specifically concerns such a case for in-splice loading of exchange area circuits.

BACKGROUND OF THE INVENTION

It is convenient in many segments of the telephone exchange area plant to house the circuit loading coils at splice points such as, for example, splice cases, access closures and pedestal terminals. The coils at these points typically heretofore have been assembled axially along a rod; and the rod has then been enclosed in a fiber tube, for example. The coil lead wires are run from the coil enclosure and spliced to their respective telephone lines.

Efforts to optimize this coil case design have centered in part on the problem of coil packaging density. The latter bears heavily not only on the coil case cost but also on the number of coils which can be included in an overall splice housing. The direction in general has been a reduction of the coil dimensions which has caused spatial inefficiencies in the axial coil assemblies. Also such assemblies, when numerous coils are enclosed, have proven fragile if flexed too much in handling.

Another problem in axially stacked coil assemblies has been the difficulty of replacing a coil shown to be faulty in routine production testing. If the bad coil is in the middle of a 25-coil stack, all outer coils at one end or the other must first be removed. This procedure raises direct costs, but also subjects the good coils to more handling and added risk of damage.

Accordingly, one object of the invention is to increase the density of packaging of telephone line loading coils at in-splice loading points.

Another object of the invention is to simplify the assembly and disassembly of groups of such coils.

A further object of the invention is to reduce the cost of loading coil cases.

A specific object of this invention is to modularize the coil assembly and holding apparatus without axially stacking the coils.

These and other objects are achieved according to the invention, broadly, by a coil pair mounting module comprising a two-sided coil holder with a short dowel centered on either side. A coil-terminal assembly is inserted onto each dowel. Each board includes two side beads constructed with aligning pins. Any number of such modules thus can be stacked by plugging one into the next.

Pursuant to another facet of the invention, the stacked modules are housed within a protective tube where they are held in axial alignment by two or three spacers. The tube, advantageously, is a simple polyethylene extrusion which serves both as mechanical protection for the coil modules and as a mold for encapsulating compound which will surround and support the coils after assembly and testing. Caps are snapped in place at each end of the tube and are retained tongue-and-groove fashion, once the coil modules are in place.

This coil module construction provides high density coil packaging while permitting removal and replacement of a faulty coil without disturbing others, a feature not possible with the earlier axial stacking scheme. The tubular housing is inexpensive and readily accommodates the modules.

The invention and its further objects, features and advantages will be readily apprehended from a reading of the description to follow of an illustrative embodiment thereof.

DESCRIPTION OF THE DRAWING

FIG. 1 is a schematic perspective showing the coil holder construction.

FIG. 2 is a schematic perspective exemplifying the inventive coil case construction.

DETAILED DESCRIPTION OF AN ILLUSTRATIVE EMBODIMENT

In FIG. 1, the coil module designated 1 consists of a one-piece board 2 with end beads 3, 4 and side dowels 5, 6. Board 2 advantageously is molded of Cycolac, or some other hard high strength plastic. Beads 3, 4 include aligning pins 7, 8 at one end, designated 9. At the other end, designated 10, corresponding pin-receiving holes 11, 12 are molded.

The coils are assembled first as a unit, designated 13, which consists of a coil 14 and an associated terminal board 15 taped together with tape 16. The terminals on board 15, of which there are conventionally four, are designated by the numeral 17 and are routinely connected to the coil 14 by wires 18.

Steel washers 19, 20 are placed over the dowels 5, 6 to serve as electromagnetic shields between the adjacent coils of the same board. Thereafter, cellulose acetate washers 21, 22 are placed onto the dowels 5, 6 to provide a dielectric barrier for prevention of potential leakage between the said adjacent coils. A coil unit 13 then is placed onto each dowel 5, 6 and the entire module is taped together with tape 23.

As many such modules 1 as desired now are assembled by plugging them together through the friction fit between aligning pins 7, 8 and receiving holes 11, 12. Typically, six, eleven, sixteen or twenty-five coils are made up by assemblies of modules 1. An odd number of coils is realized simply by omitting a coil 14 from one of the modules. A general assembly of modules 1 is depicted in FIG. 2. Conductive leads 24 are appropriately wired to the coil terminals, the wiring itself being conventional.

The wired modules 1 are assembled with two or three spacers 25 which as shown in FIG. 1 are thin square-shaped phenolic boards with holes 26 that allow them to engage pins 7, 8. Spacers 25 are placed at the ends of a module assembly, and where necessary one is placed in the middle (not shown).

A tube 27 which advantageously is extruded polyethylene is placed over the module assembly. The corners of spacers 25 ensure that the module assembly is located concentrically within the tube 27 and that the coils 14 do not touch the tube. Tube 27 has grooves 28, 29 cut into its ends, and molded caps 30, 31 are provided with tongues 32, 33. When the module assembly is located concentrically within the tube 27, the coils 14 do not touch the tube. Tube 27 has grooves 28, 29 at its ends into which molded caps 30, 31 with tongues 32, 33 fit. Cap 30 includes an opening 34 through which an encapsulating compound such as polyurethane is flowed. The compound permanently seats and seals the module assembly within the tube and is infused at the factory.

It is to be understood that the embodiments described herein are merely illustrative of the principles of the invention. Various modifications may be made thereto by persons skilled in the art without departing from the spirit and scope of the invention.

What is claimed is:

1. Apparatus for housing telephone loading coils comprising a plurality of two-sided coil-holding modules, each comprising means mounting a coil on each side, and a pair of end beads, the beads having alignment pins protruding from one end thereof and corresponding alignment chambers in the other end, the pins of a given module frictionally engaging the chambers of the adjacent module; and a housing fully enveloping said assemblage.

2. Apparatus pursuant to claim 1, wherein said coil mounting means in each said module comprises a dowel extending from a central region of each said side, the coil fitting onto said dowel.

3. Apparatus pursuant to claim 1, wherein each said module further comprises a metallic electromagnetic shielding washer between each said side and the corresponding coil and a dielectric washer.

4. Apparatus pursuant to claim 3 further comprising at least two square spacers each comprising means for engaging the aligning pins of a module, the spacer covers fixing said engaged module centrally within said tube.

5. Apparatus pursuant to claim 4, wherein one said end cap further includes an orifice for infusing encapsulating compound into said tube interior to envelope and seal said modules.

References Cited

UNITED STATES PATENTS 2,080,473   5/1937   Greenidge _____ 178—46

LARAMIE E. ASKIN, Primary Examiner

D. A. TONE, Assistant Examiner